(12) United States Patent
König et al.

(10) Patent No.: US 6,713,556 B2
(45) Date of Patent: Mar. 30, 2004

(54) DIMETHYLPYRAZOLE-BLOCKED ISOCYANATE MIXTURES

(75) Inventors: Eberhard König, Leverkusen (DE); Reinhard Halpaap, Odenthal (DE); Thomas Klimmasch, Leverkusen (DE); Hans-Ulrich Meier-Westhues, Leverkusen (DE); Harald Mertes, Bridgeville, PA (US); Joachim Schüll, Köln (DE); Bernd Steinhilber, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/275,088

(22) PCT Filed: Apr. 23, 2001

(86) PCT No.: PCT/EP01/04546
§ 371 (c)(1),
(2), (4) Date: Nov. 1, 2002

(87) PCT Pub. No.: WO01/85823
PCT Pub. Date: Nov. 15, 2001

(65) Prior Publication Data
US 2003/0171488 A1 Sep. 11, 2003

(30) Foreign Application Priority Data
May 5, 2000 (DE) .......................... 100 22 036

(51) Int. Cl.⁷ .............................. C08J 3/00; C08K 3/20; C08L 75/00; C08F 8/30

(52) U.S. Cl. .................. 524/591; 524/507; 524/589; 524/590; 524/839; 524/840; 525/123; 525/124; 525/128

(58) Field of Search ................. 524/507, 589, 524/590, 591, 839, 840; 525/123, 124, 128

(56) References Cited

U.S. PATENT DOCUMENTS 6,025,433 A * 2/2000 Shibatoh et al.

FOREIGN PATENT DOCUMENTS

EP   0 159 117   10/1985
EP   0 713 871   5/1996

OTHER PUBLICATIONS

Farbe & Lacke 7/96, (month unavailable) $102^{nd}$ year, pp. 51–58, Theodor Engbert et al, "Einsatz einkomponentiger Einbrennurethanbeschichtungen".

* cited by examiner

*Primary Examiner*—Patrick D. Niland
(74) *Attorney, Agent, or Firm*—Joseph C. Gil; Thomas W. Roy; Gary F. Matz

(57) ABSTRACT

The invention relates to particular mixtures of polyisocyanates which are blocked with 3,5-dimethylpyrazole, and to the use thereof as crosslinking component in single-component stoving lacquers, especially automotive clear lacquers.

3 Claims, No Drawings

DIMETHYLPYRAZOLE-BLOCKED ISOCYANATE MIXTURES

BACKGROUND OF THE INVENTION

The invention relates to particular mixtures of polyisocyanates which are blocked with 3,5-dimethylpyrazole, and to the use thereof as crosslinking component in single-component stoving lacquers, especially automotive clear lacquers.

The formulation of OH-containing polyacrylate resins with blocked polyisocyanates or with mixtures of melamine resins and blocked polyisocyanates to form binders for "single-component" stoving lacquers is state of the art. The properties of lacquers produced therefrom are determined by the nature both of the polyisocyanate component and of the blocking agent, since it is known that a certain proportion of the latter always remains in the lacquer.

3,5-Dimethylpyrazole, DMP for short, is mentioned as an NCO-blocking agent in stoving lacquers for the first time in EP-A 0159117B1. A comparison of the blocking agents butanoneoxime, 1,2,4-triazole and DMP is described in Farbe & Lack 7/96, 102nd year, p. 51–58, (Engbert et al.). That study shows that DMP has advantages over butanoneoxime as regards stoving temperature and thermal yellowing resistance. It has also been found that the resistance to acids of a clear lacquer based on a DMP-blocked IPDI polyisocyanate is very good and is exceeded slightly only by the analogous two-component lacquer (without blocking agent). No mention is made of the scratch resistance of that clear lacquer.

Resistance to acids and to scratching are important criteria of an automotive clear lacquer as the uppermost layer, which must withstand, for example, the influence of the surrounding atmosphere and also the conditions of a car wash. In the study cited above, a clear lacquer in which 1,2,4-triazole is used as blocking agent exhibits markedly poorer properties, for example in respect of resistance to acids.

In the publication European Coatings Conference, Berlin 1999, Vincentz Verlag, "Blocked Isocyanates—"Methods of Evaluation and Recent Developments", I. Rimmer et al., Baxenden Chemicals", information is given mainly regarding de-blocking temperatures for DMP-blocked isocyanates. The question of how to produce, using a DMP-blocked polyisocyanate, a clear lacquer having both good scratch resistance and good resistance to acids is not discussed, however.

The object of the invention is to develop blocked polyisocyanates which can be processed to a stoving lacquer having 1. good resistance to acids
2. good scratch resistance
3. good resistance to thermal yellowing and
4. a relatively low stoving temperature of from 130 to 150° C. (at 30 minutes).

That object could be achieved using the blocked polyisocyanate mixtures according to the invention.

SUMMARY OF THE INVENTION

The invention provides mixtures of blocked polyisocyanates containing a) blocked polyisocyanates based on 1,6-diisocyanatohexane (HDI),
b) blocked polyisocyanates based on cycloaliphatic diisocyanates, and
c) 3,5-dimethylpyrazole as the sole blocking agent for the polyisocyanates mentioned under a) and b), characterised in that the blocked polyisocyanates are present in relative proportions a):b)=1:1.8 to 2.2.

The invention relates also to the use of the blocked polyisocyanate mixtures according to the invention in admixture with melamine resins in the hardening of stoving lacquers, characterised in that up to 50 wt. %, based on total hardener component, of the blocked polyisocyanate mixtures a)+b) are used concomitantly.

Finally, the invention relates to the use of the blocked polyisocyanate mixtures according to the invention as hardener component in single-component stoving lacquers, especially for automotive clear lacquers.

DETAILED DESCRIPTION OF THE INVENTION

The mixtures according to the invention are a combination of the flexible blocked polyisocyanate component a) and the hard blocked polyisocyanate component b), the mixing ratios varying within the range from a:b=1:1.8 to a:b=1:2.2. A mixing ratio of a:b=1:2 is preferred.

There come into consideration as polyisocyanates for component a) the lacquer polyisocyanates, known per se, that are based on 1,6-diisocyanatohexane (HDI) having an NCO content of from 19 to 25 wt. % and that contain biuret, isocyanurate, allophanate, iminooxadiazinedione (asymmetric trimer), urethane and/or uretdione groups. Preference is given to the HDI-based lacquer polyisocyanates containing predominantly isocyanurate groups, trimerised HDI for short.

There come into consideration as polyisocyanates for component b) the lacquer polyisocyanates, known per se, that are based on cycloaliphatic diisocyanates having an NCO content of from 12 to 23 wt. % and that contain isocyanurate, allophanate, uretdione and urethane groups. Examples of cycloaliphatic diisocyanates are 1-isocyanato-3,3,5-trimethyl-5-isocyanatomethyl-cyclohexane (IPDI), bis-(4-isocyanato-cyclohexyl)-methane ($H_{12}$ MDI or Desmodur W®/Bayer AG), 2,6- and/or 2,5-bisisocyanato-norbornane or 1,4-bisisocyanatomethyl-cyclohexane. It is also possible to use 1:1 mixtures of polyisocyanates based on IPDI and Desmodur W®. Preference is given to lacquer polyisocyanates based on IPDI and Desmodur W® and containing predominantly isocyanurate groups. A lacquer polyisocyanate based on trimerised IPDI is a solid resin having an NCO content of approximately 17 wt. % and accordingly is available commercially as a 70% solution having an NCO content of approximately 12 wt. %. A polyisocyanate based on Desmodur W® and containing isocyanurate groups is described in Example 6.

The NCO-blocking agent 3,5-dimethylpyrazole is a colourless solid (m.p. 107° C.), which can be obtained relatively easily and quantitatively by condensation of 1 mol of acetylacetone with 1 mol of hydrazine hydrate. However, for blocking of the isocyanates it is also possible to use the warm reaction solution of the mentioned starting materials, as described, for example, in EP-A 0713871B1. According to the invention, all the isocyanate groups of the isocyanates used are blocked, so that no free isocyanate groups are present in the mixtures according to the invention.

The blocked polyisocyanate mixtures according to the invention are mixed with organic polyhydroxyl compounds in a conventional manner to form single-component lacquer binders, by combining the amount of blocked NCO groups with the corresponding amount of OH groups. The stoichiometric ratio of blocked NCO:OH=1:1.

If a single-component stoving lacquer is crosslinked predominantly, for example, with melamine resin and the blocked polyisocyanate mixture according to the invention is used as modifying component, then the mixing ratio of the binder components must be determined empirically. A reference point for the quantitative distribution of polyacrylate:melamine resin:blocked polyisocyanate mixture is provided by the ratio of 70:20:10 wt. %, based on the particular solid resins in question, indicated in the Examples. In the case of such mixed crosslinking, the crosslinking components, namely melamine resin and blocked polyisocyanate mixture, are present in a weight ratio of 2:1. Depending on the desired effect, that is to say whether melamine resin crosslinking or crosslinking with blocked polyisocyanates is preferred, the above mixing ratio may be varied from 5:1 to 1:2.

Using the blocked polyisocyanate mixtures according to the invention, clear lacquers having good resistance to acids, scratch resistance and thermal yellowing resistance are obtained.

EXAMPLES

Example 1 a) Starting Materials

The synthesis of blocked polyisocyanate components is described.

| | |
|---|---|
| 196 g (1.0 gram eq.) | of an isocyanurate-containing lacquer polyisocyanate based on 1,6-diisocyanatohexane (HDI) having an NCO content of 21.4 wt. %, a viscosity at 23° C. of approximately 3000 mPas and a functionality of approximately 3.5 |
| 100 g (1.05 mol) | of 3,5-dimethylpyrazole (DMP) |
| 34 g | of 1-methoxy-propyl acetate (MPA) |
| 65 g | of solvent naphtha 100 |
| 395 g (1.0 gram eq.) | of blocked NCO groups |
| | solids content: (296 g) 75 wt. % |
| | viscosity at 23° C.: approx. 4000 mPas |
| | blocked NCO content: 10.6 wt. % |
| | 1 gram eq. of blocked NCO groups: 395 g |

Procedure:

Polyisocyanate and solvent mixture are placed in a vessel. Solid DMP is added in portions, with stirring, at from 75 to 85° C., and stirring is carried out for approximately one hour at 80° C. until no further NCO groups can be detected. A clear, slightly yellowish (Hazen 30-40) solution having the above-mentioned characteristics is obtained.

b) Starting Materials

| | |
|---|---|
| 350.0 g (1.0 gram eq.) | of an isocyanurate-containing lacquer polyisocyanate based on 1-isocyanato-3,3,5-trimethyl-5-isocyanatomethyl-cyclohexane (IPDI), 70% dissolved in butyl acetate and having an NCO content of 12.0 wt. % |
| 100.0 g (1.05 mol) | of 3,5-dimethylpyrazole (DMP) |
| 125.0 g | of solvent naphtha 100 |
| 575.0 g (1.0 gram eq.) | of blocked NCO groups |
| | solids content: (345 g) 60 wt. % |
| | viscosity at 23° C.: approx. 2000 mPas |
| | blocked NCO content: 7.3 wt. % |
| | 1 gram eq. of blocked NCO groups: 575 g |

Procedure:

Polyisocyanate and solvent are placed in a vessel. Solid DMP is added in portions, with stirring, at from 85 to 95° C., and stirring is carried out for approximately one hour at 95° C. until no further NCO content can be detected (IR spectrum). A clear, slightly yellow solution having the above-mentioned characteristics is obtained.

Example 2

(According to the Invention)

There are shown the mixture according to the invention of the two blocked polyisocyanate components of Examples 1a+1b in a weight ratio of 1:2, as well as a lacquer binder prepared therefrom.

| | Amount [g] | Gram eq. of blocked NCO | Solids [g] | Weight ratio a/b |
|---|---|---|---|---|
| Blocked polyisocyanate a) see Example 1a) | 145.4 | 0.368 | 109 | 1 |
| Blocked polyisocyanate b) see Example 1b) | 363.4 | 0.632 | 218 | 2 |
| | 508.8 | 1.000 | 427 | |

The blocked polyisocyanate mixture according to the invention is combined with the polyacrylate Desmophen® A VP LS 2009/1 (70% in butyl acetate, OH content 3 wt. %, 1 gram eq. of OH groups=566 g, Bayer AG) to form a lacquer binder, as follows.

Lacquer binder

| | Amount [g] | Equivalents of blocked NCO or OH | Reduced amounts in g for lacquer batch = 100% |
|---|---|---|---|
| Blocked polyisocyanate a) see Example 1a) | 145.4 | 0.368 | 9.8 |
| Blocked polyisocyanate b) see Example 1b) | 363.4 | 0.632 | 24.6 |
| Desmophen A VP LS 2009/1 70% in butyl acetate, OH equivalent 566 g | 566.0 | 1.00 | 38.4 |
| | 1074.8 | | 72.8 |

Example 3

(According to the Invention)

Lacquer preparations containing both the blocked polyisocyanate mixture of the invention according to Example 2 and a comparison are prepared, baked for 30 minutes at 140° C. and evaluated in respect of resistance to acids, scratch resistance and thermal yellowing stability.

a) Lacquer Preparations

| Composition [wt. %] | Lacquer 1 (according to the invention) | Lacquer 2 (comparison) |
|---|---|---|
| Desmophen A VP LS 2009/1, 70% in BA | 38.4 | 36.7 |
| Blocked polyisocyanate according to Example 1a | 9.8 | — |
| Blocked polyisocyanate according to Example 1b | 24.6 | 37.3 |
| | 72.8 | 74.0 |
| Dibutyltin dilaurate, 10% in xylene (Brenntag AG) | 4.9 | 4.8 |
| Baysilone OL 17, 10% in xylene (Bayer AG) | 0.5 | 0.5 |
| Modaflow, 1% in xylene (Monsanoto Co., St. Louis) | 0.5 | 0.5 |
| Tinuvin 292, 10% in xylene (Ciba Speciality Chemicals Inc. Basle) | 4.9 | 4.8 |
| Tinuvin 1130, 10% in xylene (see above) | 9.8 | 9.6 |
| 1-Methoxypropyl acetate/solvent naphtha 100 (1/1) | 4.7 | 3.9 |
| Butyl glycol acetate | 1.9 | 1.9 |
| | 100.0 | 100.0 |

In both lacquer preparations, the ratio of blocked NCO groups to OH groups is 1.0. In contrast to lacquer 1 according to the invention, only one of the two blocked polyisocyanate components is used in lacquer 2.

Lacquer preparations 1 and 2 are sprayed in the form of clear lacquers onto test sheets having a white water-based lacquer and are baked for 30 minutes at 140° C.

| | Lacquer 1 (according to the invention) | Lacquer 2 (comparison) |
|---|---|---|
| Resistance to acids [° C.] (Gradient furnace, Daimler-Chrysler test method) | | |
| $H_2SO_4$, 1% | 51 | 53 |
| Scratch resistance (laboratory washing unit, DFO[1] test method, DIN standard in preparation) | | |
| Initial gloss 20° | 90.6 | 91.4 |
| Loss of gloss (Δ gl.) after 10 washing cycles 20° | 30.3 | 40.6 |
| Relative residual gloss [%] | 66.6 | 55.6 |
| Thermal yellowing stability (colorimetric determination, CIELAB; DIN 6174) | | |
| Clear lacquer on water-based lacquer, white | | |
| Initial yellowing [b value] | −1.5 | −1.7 |
| Over-bake yellowing at 30 min. 160° C. [Δb] | 0.3 | 0.4 |

[1] DFO = Deutsche Forschungsgesellschaft für Oberflächenbehandlung e.V.

As will be seen, the resistance to acids of the comparison lacquer, with 53° C., is slightly better than that of the lacquer according to the invention, with 51° C., which represents a good value.

By contrast, in the case of the scratch resistance measurement, the residual gloss of lacquer 1 according to the invention is 11% higher than that of lacquer 2.

Both lacquers exhibit equally good thermal yellowing stability.

Example 4

Binders are described in which the OH-containing polyacrylate is hardened predominantly with melamine resin and to the extent of only 10 wt. %, based on binder, with blocked polyisocyanate. The optimum mixing ratio of the three binder components OH polyacrylate:melamine resin::blocked polyisocyanate was determined as a solid resin ratio of 70:20:10. In this case too it is shown that the best results are obtained with a clear lacquer in which 10 wt. % of the binder consists of the blocked polyisocyanate mixture according to the invention.

a) Binder Containing Melamine Resin and Blocked Polyisocyanate Mixture According to the Invention (According to the Invention)

| Binder components | Amounts [g] | Solids [g] | Mixing ratio |
|---|---|---|---|
| Desmophen A VP LS 2009/1, 70%; see Example 2 | 46.5 | 32.55 | 70 |
| Setamin US-138 BB-70, 70% in butanol, Akzo-Nobel Resins, Bergen op Zoom | 13.3 | 9.31 | 20 |
| Blocked polyisocyanate a) according to Example 1a), 75% | 2.1 | 1.57 | 10 |
| Blocked polyisocyanate b) according to Example 1b), 60% | 5.2 | 3.12 | |

As will be seen from the above table, the two blocked polyisocyanates are present in the mixing ratio according to the invention of comp. a:comp. b=1:2.

b) Binder Containing Melamine Resin and Blocked Polyisocyanate (Comparison)

| Binder components | Amounts [g] | Solids [g] | Mixing ratio |
|---|---|---|---|
| Desmophen A VP LS 2009/1, 70%; see Example 2 | 46.7 | 32.7 | 70 |
| Setamin US-138 BB-70, 70%, see Example 4a) | 13.3 | 9.3 | 20 |
| Blocked polyisocyanate a) according to Example 1a), 75% | 6.2 | 4.65 | 10 | c) Binder Containing Only the Melamine Resin Crosslinking Agent (Comparison)

| Binder components | Amounts [g] | Solids [g] | Mixing ratio |
|---|---|---|---|
| Desmophen A VP LS 2009/1, 70%; see Example 2 | 47.6 | 33.32 | 70 |
| Setamin US-138 BB-70, 70%, see Example 4a) | 20.4 | 14.28 | 30 |

Example 5

Clear lacquer preparations with mixed crosslinking by means of two different melamine resin/polyisocyanate mixtures and with crosslinking purely by means of melamine, and the comparative lacquer test, are described.

| Composition in wt. % | Lacquer 3 (according to the invention, see Example 4a) | Lacquer 4 (see Example 4b) | Lacquer 5 (see Example 4c) |
|---|---|---|---|
| Desmophen A VP LS 2009/1 | 46.5 | 46.7 | 47.6 |
| Setamin US-138 BB-70 | 13.3 | 13.3 | 20.4 |
| Blocked polyisocyanate a) according to Example 1a) | 2.1 | 6.2 | — |
| Blocked polyisocyanate b) according to Example 1b) | 5.2 | — | — |
| Dibutyltin dilaurate, see Example 3a) | 2.6 | 2.6 | — |
| p-Toluenesulfonic acid, 10% in xylene, Merck-Schuchardt | 1.0 | 1.0 | 1.0 |
| Baysilone OL 17, see Example 3a) | 0.5 | 0.5 | 0.5 |
| Modaflow, see Example 3a) | 0.5 | 0.5 | 0.5 |
| Tinuvin 292, see Example 3a) | 5.1 | 5.1 | 5.2 |
| Tinuvin 1130, see Example 3a) | 10.2 | 10.2 | 10.4 |
| 1-Methoxypropyl acetate/ solvent naphtha | 10.7 | 11.6 | 12.0 |
| Butyl glycol acetate | 2.3 | 2.3 | 2.4 |
|  | 100.0 | 100.0 | 100.0 |

Lacquer 3 contains the blocked polyisocyanate mixture according to the invention in an amount of 10 wt. %, based on the solids content of the binder. Lacquer 4, like lacquer 3, represents mixed crosslinking with melamine resin blocked polyisocyanate, but without the polyisocyanate mixture according to the invention. Crosslinking in the case of lacquer 5 is purely by means of melamine resin.

b) Evaluation of the Lacquers

Lacquer preparations 3 to 5 are sprayed in the form of clear lacquers onto test sheets having a white water-based lacquer and are baked for 30 minutes at 140° C.

b) Lacquer Evaluation

|  | Lacquer 3 (according to the invention) | Lacquer 4 (comparison) | Lacquer 5 (comparison) |
|---|---|---|---|
| Resistance to acids [° C.] (Gradient oven; Daimler-Chrysler test method) |  |  |  |
| $H_2SO_4$, 1 wt. % | 41 | 38 | 36 |
| Scratch resistance (laboratory washing unit, DFO test method, DIN standard in preparation) |  |  |  |
| Initial gloss 20° | 91.9 | 92.1 | 95.3 |
| Loss of gloss (Δgl.) after 10 washing cycles 20° | 27.4 | 25.5 | 33.0 |

-continued

|  | Lacquer 3 (according to the invention) | Lacquer 4 (comparison) | Lacquer 5 (comparison) |
|---|---|---|---|
| Relative residual gloss [%] | 67.5 | 70.3 | 65.4 |
| Thermal yellowing stability (CIELAB; DIN 6174) |  |  |  |
| Initial yellowing [Δb value] | −2.0 | −1.9 | −2.1 |
| Over-bake yellowing at 30 min. 160° C. [Δb value] | 0.4 | 0.2 | 0.4 |

In the above overview, lacquer 3, with 41° C., exhibits the highest resistance to acids. However, that is 10° C. lower than in the case of the pure polyisocyanate crosslinking according to Example 3b). Lacquer 5 shows the highest scratching with a residual gloss of only 65.4%. The overbake yellowing is very low and is in order in all three lacquer variants. Lacquer 3 (according to the invention) performs better than lacquer 4 and markedly better than lacquer 5.

Example 6

(According to the Invention)

The preparation of a DMP-blocked Desmodur W trimerisate, the corresponding binder combination and the evaluation of the clear lacquer are described.

a) Preparation of the DMP-blocked Desmodur W® Trimerisate

Starting Materials:

1) Trimerisation

| | | | |
|---|---|---|---|
| 2.0 gram eq. | Desmodur W = | 262.0 g | |
| 0.7 gram eq. | trimerisation with 10% Triton B solution = | — | |
| 1.3 gram eq. | Desmodur W partly trimerised = | 262.0 g | NCO: calc. 20.8% found 20.3% |
| | butyl diglycol acetate (BDGA) = | 65.5 g | |
| 1.3 gram eq. | partly trimerised Desmodur W = | 327.5 g | NCO: calc. 16.67% found 16.13% |
| 1.0 gram eq. | partly trimerised Desmodur W, 80% in BDGA = | 260.4 g | |

2) Blocking

| | | |
|---|---|---|
| 1.0 gram eq. | partly trimerised Desmodur W = | 260.4 g |
| 1.05 mol | 3,5-dimethylpyrazole (DMP) = | 100.8 g |
| | 1-methoxypropyl acetate (MPA) = | 154.0 g |
| 1.0 gram eq. | DMP-blocked Desmodur W trimerisate = | 515.2 g |
| | solids content: | 309.12 g, 60 wt. % |
| | viscosity at 23° C.: | 1850 mPas |
| | blocked NCO content: | 8.15 wt. % |

Procedure:

1) Desmodur W is freed of $CO_2$ by means of a vacuum and placed in a vessel at 85° C., with stirring. Triton B solution, 10% in n-butanol, is added thereto initially in an amount of about 2 ml, later very finely, so that the exothermic reaction is always maintained at from 85 to 90° C. After 3 ½ hours at 90° C. and the consumption of 11.7 ml of catalyst solution, an NCO content of 20.3 wt. % is found. The mixture is diluted with butyl diglycol acetate and allowed to cool.

2) Partly trimerised Desmodur W and MPA are placed in a vessel at 80° C. DMP is introduced in relatively large portions, with stirring, and the mixture is reacted at 90° C. for about one hour until no further NCO groups can be detected (IR spectrum). A clear, slightly yellowish solution having the above-mentioned characteristics is obtained.

b) Preparation of the mixture according to the invention of the flexible and the hard blocked polyisocyanate components in a weight ratio of 1:2 and of a lacquer binder analogously to Example 2.

| | Amount [g] | Solids content [g] | Weight ratio a/b | Gram eq. of blocked NCO groups |
|---|---|---|---|---|
| Blocked polyisocyanate a) according to Example 1a) - based on: HDI trimerisate | 140.2 | 105.0 | 1 | 0.355 |
| Blocked polyisocyanate b) according to Example 6a) - based on: Desmodur W ® trimerisate | 332.3 | 210.0 | 2 | 0.645 |
| | 472.5 | 315.0 | | 1.000 |

The lacquer binder is formed analogously to Example 2 from the above crosslinking agent mixture according to the invention, as follows:

Lacquer Binder

| | Amount [g] | Equivalents of blocked NCO or OH | Reduced amount in g for lacquer preparation = 100 g |
|---|---|---|---|
| Blocked polyisocyanate a) according to Example 1a) | 140.2 | 0.355 | 9.8 |
| Blocked polyisocyanate b) according to Example 6a) | 332.3 | 0.695 | 23.3 |
| Desmophen A VP LS 2009/1, 70% in butyl acetate, OH equivalent = 566 g | 566.0 | 1.000 | 39.6 |
| | 1038.5 | | 72.7 |

That lacquer binder is processed, as shown in Example 3, with additives and solvents to form a clear lacquer which is ready for spraying, and is sprayed onto test sheets having a white water-based lacquer and baked for 30 minutes at 140° C.

c) Evaluation of the Lacquer

| | |
|---|---|
| Resistance to acids [° C.] (see Example 3b) | |
| H$_2$SO$_4$, 1% | 50 |
| Scratch resistance (see Example 3b) | |
| Initial gloss 20° | 90.9 |
| Loss of gloss after 10 washing cycles 20° | 26.2 |
| Relative residual gloss [%] | 71.2 |
| Over-bake yellowing at 30 min. 160° C. (see Example 3b) [Δb] | 0.5 |

As will be seen by comparison with lacquer 1 according to Example 3b) (HDI/IPDI trimerisate=1:2 weight ratio), the above lacquer (HDI/W trimerisate=1:2 weight ratio) has advantages in terms of scratch resistance. Resistance to acids and over-bake yellowing have equally good values.

What is claimed is:

1. A mixture of blocked polyisocyanates comprising
    a) a blocked polyisocyanate prepared from 1,6-diisocyanatohexane (HDI) and blocked with 3,5-dimethylpyrazole and
    b) a blocked polyisocyanate prepared from a cycloaliphatic diisocyanate and blocked with 3,5-dimethylpyrazole,
wherein blocked polyisocyanates a) and b) are present in a weight ratio, based on resin solids, of 1:1.8 to 1:2.2.

2. A one-component stoving lacquer comprising a polyacrylate polyol and, as crosslinking agent, a mixture of a melamine resin and the mixture of blocked polyisocyanates of claim 1 in a weight ratio, based on resin solids, of melamine resin to blocked polyisocyanates of 5:1 to 1:2.

3. A one-component stoving lacquer comprising a polyacrylate polyol and, as crosslinking agent, the mixture of blocked polyisocyanates of claim 1.

* * * * *